(12) United States Patent
Wilfred et al.

(10) Patent No.: US 11,797,788 B2
(45) Date of Patent: Oct. 24, 2023

(54) CONFIGURING SECURITY TAGS BASED ON DIRECTIONS OF MOVEMENT OF PRODUCTS ASSOCIATED WITH THE SECURITY TAGS

(71) Applicant: ZEBRA TECHNOLOGIES CORPORATION, Lincolnshire, IL (US)

(72) Inventors: Sajan Wilfred, Kollam (IN); Umesh Manthrayil Sachidanandan, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/681,609

(22) Filed: Feb. 25, 2022

(65) Prior Publication Data
US 2023/0274106 A1 Aug. 31, 2023

(51) Int. Cl.
*G06K 7/10* (2006.01)
(52) U.S. Cl.
CPC .............................. *G06K 7/10227* (2013.01)

(58) Field of Classification Search
CPC .................................................. G06K 7/10227
See application file for complete search history.

(56) References Cited

U.S. PATENT DOCUMENTS

| 7,527,198 B2* | 5/2009 | Salim | G07G 1/12 340/572.1 |
|---|---|---|---|
| 9,508,238 B2* | 11/2016 | Zeng | G06K 7/10356 |
| 10,997,838 B2* | 5/2021 | Patterson | G08B 13/2411 |
| 2013/0278425 A1* | 10/2013 | Cunningham | G08B 13/246 340/572.1 |
| 2015/0194030 A1* | 7/2015 | Davidson | G08B 13/248 340/572.7 |

* cited by examiner

*Primary Examiner* — Seung H Lee

(57) ABSTRACT

In some implementations, a device may configure security tags. The device may receive, from one or more cameras associated with the device, image data associated with a product moving through a scanning zone of the device. The device may determine, based on the image data, a direction of movement associated with the product moving through the scanning zone of the device. The device may configure, via a reader of the device and based on the direction of movement associated with the product, a setting of a security tag associated with the product.

19 Claims, 6 Drawing Sheets

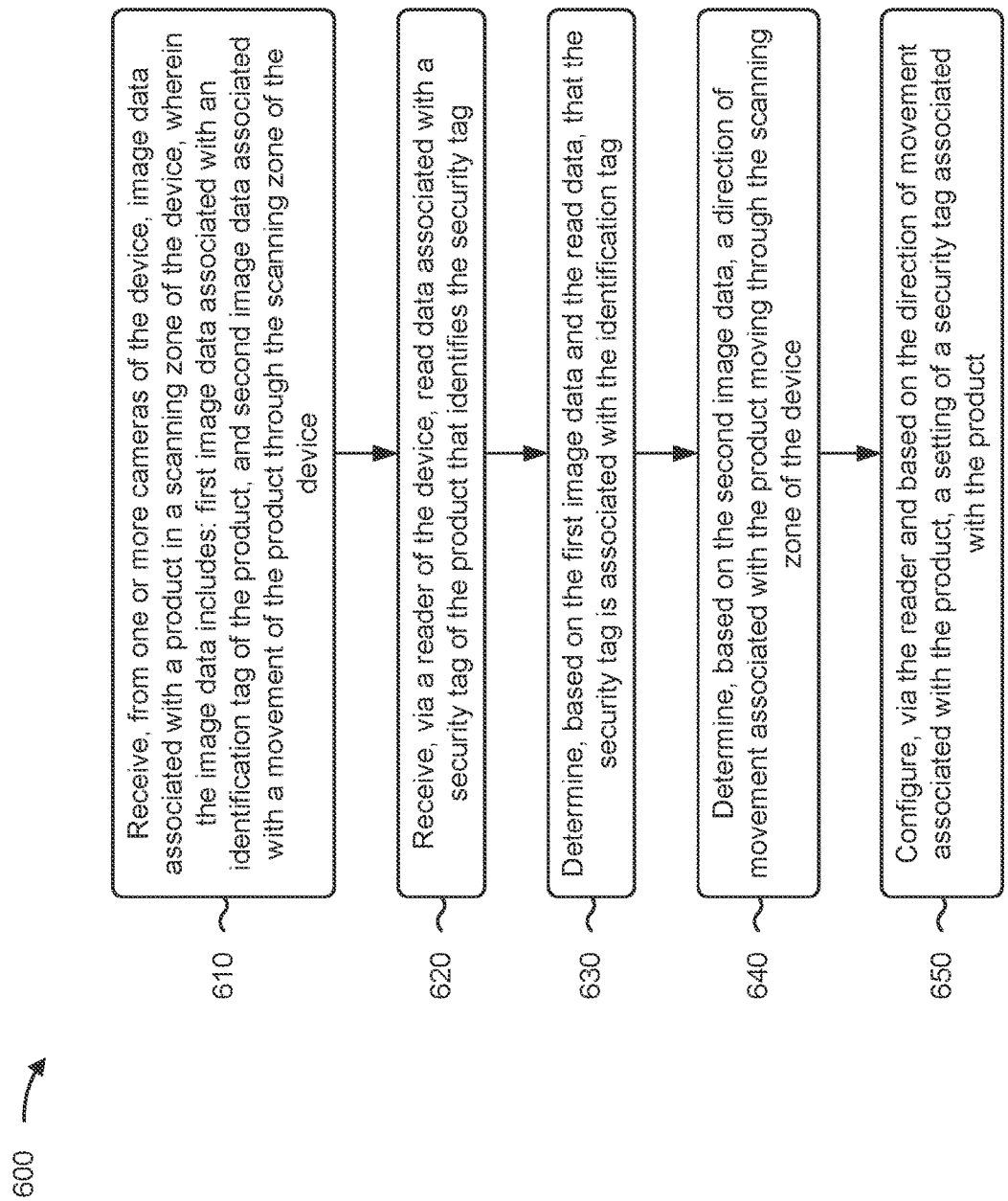

CONFIGURING SECURITY TAGS BASED ON DIRECTIONS OF MOVEMENT OF PRODUCTS ASSOCIATED WITH THE SECURITY TAGS

BACKGROUND

Brick-and-mortar retail stores are often visited for purchasing a variety of products, such as apparel, household items, toys, electronics, and other items. Some products may be attached to security tags. For example, a certain product that is prone to theft may be attached to a security tag to deter the theft of the product. The security tag may be deactivated by a retail store clerk during a checkout process. When the security tag is not deactivated and passes through an exit gate of a brick-and-mortar retail store, an alarm may be sounded, which may alert retail store personnel that a customer might be trying to steal the product associated with the security tag.

SUMMARY

Some implementations described herein relate to a method for configuring security tags based on directions of movement. The method may include receiving, by a device and from one or more cameras associated with the device, image data associated with a product moving through a scanning zone of the device. The method may include determining, by the device and based on the image data, a direction of movement associated with the product moving through the scanning zone of the device. The method may include configuring, via a reader of the device and based on the direction of movement associated with the product, a setting of a security tag associated with the product.

Some implementations described herein relate to a device. The device may include a component operable to capture movement data associated with a product moving through a scanning zone of the device. The device may be configured to receive, from the component, the movement data associated with the product moving through the scanning zone of the device. The device may be configured to receive, via a multi-antenna reader of the device, read data associated with a security tag of the product that identifies the security tag. The device may be configured to determine, based on the movement data, a direction of movement associated with the product moving through the scanning zone of the device. The device may be configured to configure, via the multi-antenna reader and based on the direction of movement associated with the product and the read data, a setting of a security tag associated with the product.

Some implementations described herein relate to a tangible machine-readable medium that stores a set of instructions for a device. The set of instructions, when executed by one or more processors of the device, may cause the device to receive, from one or more cameras of the device, image data associated with a product in a scanning zone of the device, wherein the image data includes: first image data associated with an identification tag of the product; and second image data associated with a movement of the product through the scanning zone of the device. The set of instructions, when executed by one or more processors of the device, may cause the device to receive, via a reader of the device, read data associated with a security tag of the product that identifies the security tag. The set of instructions, when executed by one or more processors of the device, may cause the device to determine, based on the first image data and the read data, that the security tag is associated with the identification tag. The set of instructions, when executed by one or more processors of the device, may cause the device to determine, based on the second image data, a direction of movement associated with the product moving through the scanning zone of the device. The set of instructions, when executed by one or more processors of the device, may cause the device to configure, via the reader and based on the direction of movement associated with the product, a setting of a security tag associated with the product.

BRIEF DESCRIPTION OF THE DRAWINGS

FIG. 6 is a flowchart of an example processes associated with a system configuration for configuring security tags based on directions of movement.

DETAILED DESCRIPTION

Figure 1:
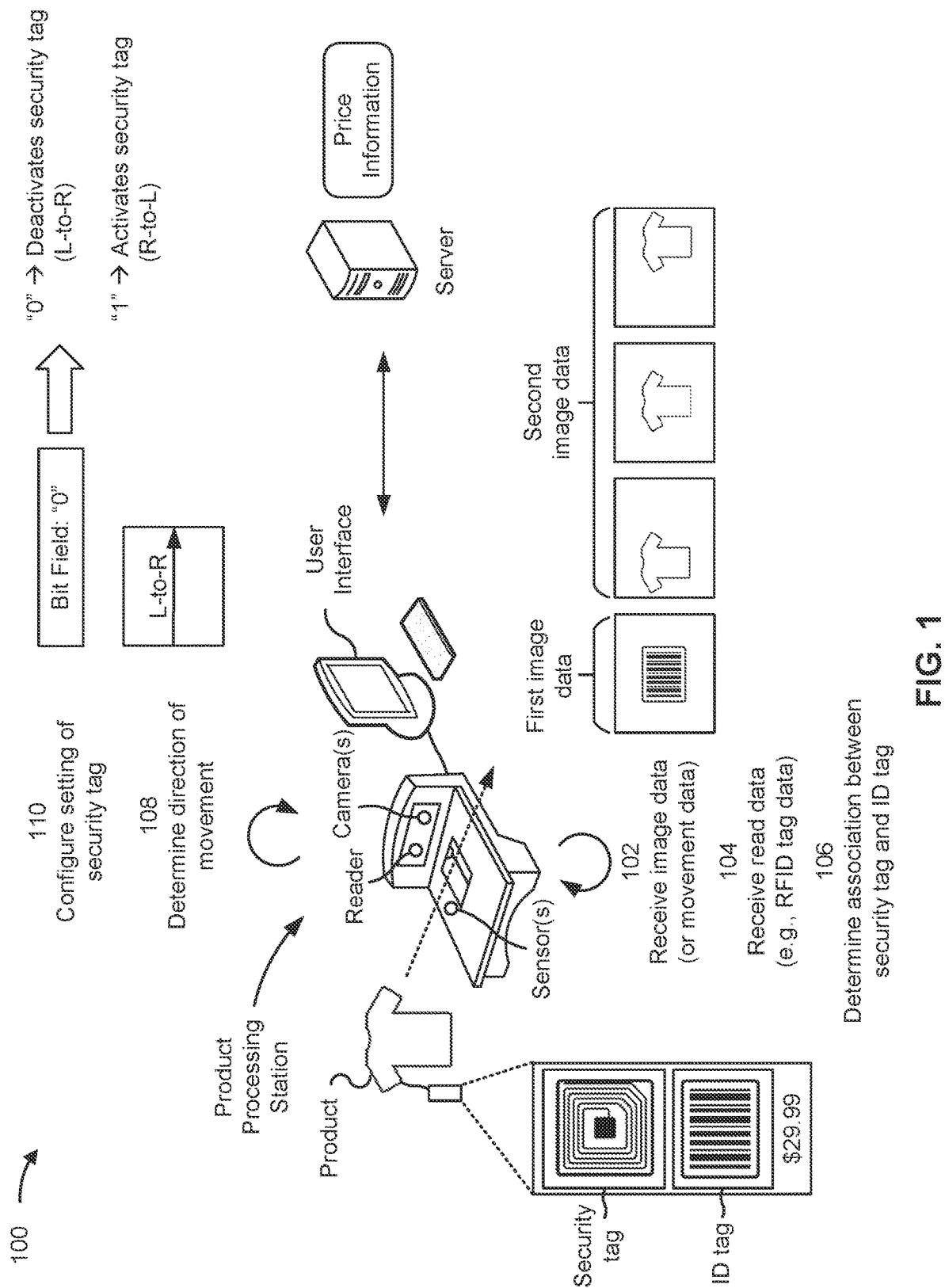
FIG. 1 is a diagram of an example implementation associated with configuring security tags based on directions of movement of products associated with the security tags, as described herein.

The following detailed description of example implementations refers to the accompanying drawings. The same reference numbers in different drawings may identify the same or similar elements.

Brick-and-mortar retail stores provide a variety of products for sale, such as apparel, household items, toys, electronics, and other items. Some products may be attached to security tags. For example, a certain product that is prone to theft may tagged with a security tag to deter the theft of the product. The security tag may be attached to the product. The security tag may be deactivated and/or removed from the product by a retail store clerk during a checkout process (e.g., after the product is scanned into a point-of-sale (PoS) terminal and payment is received). During a deactivation of the security tag, a reader (or transmitter) operated by the retail store clerk may write or modify certain bits in a memory of the security tag, which may cause the security tag to be deactivated. When the security tag is not deactivated and passes through an exit gate of a brick-and-mortar retail store, an alarm may be sounded, which may alert retail store personnel that a customer might be trying to steal the product associated with the security tag.

As an example, the security tag may be an ultra-high-frequency (UHF) radio-frequency identification (RFID) tag that supports electronic article surveillance (EAS). The EAS may enable the security tag to be used for security and theft protection. The security tag may include an antenna and an integrated circuit. The integrated circuit may include one or more types of memory, such as reserved memory, electronic product code (EPC) memory, tag identifier (TID) memory, and/or user memory. The reserved memory may store a kill password to permanently disable the security tag and an access password to lock/unlock the security tag's write capabilities. The EPC memory may store an EPC associated with the product. The TID memory may store a unique tag identification number by a manufacturer. The user memory may be used to store additional information.

In some cases, the product may be returned to the brick-and-mortar retail store or a new product may arrive at the brick-and-mortar retail store. In these cases, the product may be attached to a security tag that is deactivated. When the product enters the brick-and-mortar retail store, the security tag associated with the product may need to be activated (or reactivated) before the product is made available for sale. During an activation (or reactivation) of the security tag, the reader (or transmitter) may write or modify certain bits in the memory of the security tag, which may cause the security tag to be activated. At this point, the product may be placed on a shelf of the brick-and-mortar retail store and may be available for sale.

One problem with such approaches is that the security tag associated with the product needs to be manually activated/deactivated by the retail store clerk. The activation/deactivation may be an additional step of the checkout process, as the activation/deactivation often occurs after the product is scanned into the PoS terminal and the payment is received. The activation/deactivation of the security tag may use a separate machine (e.g., a machine that is separate from the PoS terminal). This additional step may increase an amount of time associated with the checkout process, thereby reducing an efficiency of the checkout process. When a transaction involves numerous products and numerous tags that need to be deactivated, an excessive amount of time may be needed for the checkout process, which may cause longer wait time for other customers waiting to check out at the brick-and-mortar retail store. Longer wait times may reduce customer satisfaction and potentially reduce sales at the brick-and-mortar retail store. Similarly, when products are being returned to the brick-and-mortar retail store or new products are arriving at the brick-and-mortar retail store, activating (or reactivating) the security tags may take an undue amount of time and strain resources at the brick-and-mortar retail store.

Another problem is that, in some cases, the security tag may be unintentionally not deactivated by the retail store clerk, and the passing of the security tag through the exit gate may trigger the alarm to sound even though no theft is occurring. This event may be a troubling experience for a customer that legitimately purchases the product, and such events may result in the customer no longer shopping at the brick-and-mortar retail store. Further, if the security tag is not properly activated/reactivated, a theft may not be detected.

As a result, there is a need for an improved approach for activating/deactivating security tags associated with products, such that the activation/deactivation of the security tags may be performed in a reduced amount of time and is less likely to be improperly performed. In other words, the activation/deactivation of the security tags should not be subjected to human error by retail store clerks or other employees.

In some implementations described herein, to solve the problems described above, as well as to integrate activation/deactivation of security tags into a checkout process, a technical solution is described herein for a product processing station (e.g., a PoS terminal) that configures (e.g., activates or deactivates) a security tag (e.g., an RFID tag that provides EAS) when a product associated with the security tag is scanned into the product processing station. During the checkout process, the product processing station may receive, from one or more cameras associated with the product processing station, image data associated with the product as the product moves through a scanning zone of the product processing station. The image data may include first image data associated with an identification tag (e.g., a barcode) of the product. The image data may include second image data associated with a movement of the product through the scanning zone of the product processing station. The product processing station may determine, based on the image data, a direction of movement associated with the product moving through the scanning zone of the product processing station. For example, the direction of movement may be left-to-right or right to-left. The product processing station may configure, via a reader (e.g., an RFID reader) and based on the direction of movement associated with the product, a setting of the security tag. When configuring the setting of the security tag, the product processing station may configure a bit field of the security tag with a value (e.g., "0" or "1") that activates/deactivates the security tag. The product processing station may deactivate the security tag when the product is being purchased, or the product processing station may activate the security tag when the product is being returned to a brick-and-mortal retail store or newly arrives at the brick-and-mortar retail store.

In some implementations, activating/deactivating the security tag based on the direction of movement associated with the product may provide various benefits. During the checkout process, a scanning of the product and the activation/deactivation of the security tag may be performed during a single action (e.g., a single swipe of the product). For example, the identification tag and the security tag may be scanned by the camera and the reader, respectively, at approximately the same time as the product moves through the scanning zone of the product processing station. The camera may function to capture an image of the identification tag, such that the product may be appropriately identified and added to a transaction involving a customer that is purchasing the product. The camera may also function to capture images of the product as the product moves through the scanning zone of the product processing station, and the images may be analyzed (e.g., using computer vision or machine vision) to determine the direction of movement of the product. The reader may function to capture read data associated with the security tag, where the read data may identify the security tag. The reader may also function to configure the setting of the security tag based on the direction of movement of the product. As a result, as the product moves through the scanning zone of the product processing station, the product may be added to the transaction and the security tag may be deactivated at approximately the same time, which may save time and manual labor of a retail store clerk that is involved in the checkout process.

In some implementations, the retail store clerk does not need to use a separate machine to manually activate/deactivate the security tag, since the activation/deactivation of the security tag may be integrated with the product processing station. Integrating the activation/deactivation of the security tag with the product processing station may reduce an amount of time needed to handle activations/deactivations of products. Further, an automatic activation/deactivation of the security tag via the reader of the product processing station during the checkout process may reduce a likelihood of an error made by the retail store clerk, which may avoid an alarm being unnecessarily sounded due to the security tag being improperly deactivated.

FIG. 1 is a diagram of an example implementation 100 associated with configuring security tags based on directions of movement of products associated with the security tags, as described herein. As shown in FIG. 1, example implementation 100 includes a product processing station and a server. These devices are described in more detail below in connection with FIG. 4 and FIG. 5.

In some implementations, the product processing station may be a PoS terminal at a brick-and-mortar retail store. The product processing station may be operated by a retail store clerk, or the product processing station may be self-operated by a customer at the brick-and-mortar retail store. The product processing station may be a multi-planar scanner that includes a tower and a platter. The tower and/or the platter may include one or more cameras, a reader (or transmitter) (e.g., an RFID reader/transmitter) with multiple antennas (e.g., a multi-antenna reader), and/or one or more sensors (e.g., infrared sensors) which may be used for motion detection. The one or more cameras may include a monochrome camera and/or a color camera. The monochrome camera may be well suited for capturing identification tags of products, and the color camera may be well suited for capturing movements of products. The platter may be associated with a scanning zone of the product processing station. For example, when scanning a product during a checkout process, the product may be swiped over the platter.

In some implementations, the product may be associated with a security tag and an identification (ID) tag. The security tag may be a UHF RFID tag that supports EAS. The identification tag may be a barcode. The security tag and the identification tag may be attached to the product. In some cases, a single tag may include both the security tag and the identification tag, such that the single tag may be scanned by the product processing station to read both the security tag and the identification tag.

As shown by reference number 102, the product processing station may receive image data associated with the product. The product processing station may receive, from one or more cameras of the product processing station, the image data after the product is scanned during the checkout process. The image data may be of the product as the product moves through the scanning zone of the product processing station. The one or more cameras may capture a field of view of the one or more cameras, which may produce the image data. The one or more cameras may be triggered to capture the field of view based on movement (e.g., the product being swiped across the platter), where the movement may be detected using the one or more sensors. Based on the movement detected, the one or more cameras may also illuminate a scene associated with the field of view, which may result in the image data being of higher quality. The image data may include first image data and second image data. The first image data may be associated with the identification tag of the product. The first image data may be captured by the monochrome camera. The second image data may be associated with a movement of the product through the scanning zone of the device. The second image data may include a plurality of frames of the product as the product moves through the scanning zone of the product processing station. The second image data may provide a sequence of continuous image frames of the product. The second image data may be captured by the color camera.

As shown by reference number 104, the product processing station may receive, via the reader, read data (e.g., RFID tag data) associated with the security tag. The read data may identify the security tag. For example, the read data may indicate a unique tag identification number by a manufacturer. The read data may also indicate one or more passwords, an EPC associated with the product, and/or additional information. In some cases, instead of the EPC or in addition to the EPC, the read data may include a uniform product code (UPC) or a stock keeping unit (SKU).

As shown by reference number 106, the product processing station may determine, based on the first image data (e.g., the barcode) and the read data, that the security tag is associated with the identification tag. The security tag and the identification tag may follow a one-to-one mapping, such that one security tag may be associated with one identification tag. The product processing station may determine, from the barcode, a product code such as an EPC, UPC, or SKU associated with the product. The product processing station may determine, from the read data associated with the security tag, a product code such as an EPC, UPC, or SKU indicated in the read data. The product processing station may determine whether the read data associated with the security tag corresponds to the first image data. In other words, the product processing station may determine whether the product code indicated in the security tag corresponds to the product code associated with the barcode of the product. When the product code indicated in the security tag matches the product code associated with the barcode of the product, the product processing station may determine that the security tag is associated with the product with the identification tag. When the product code indicated in the security tag does not match the product code associated with the barcode of the product, the product processing station may determine that the security tag is not associated with the product with the identification tag.

In some implementations, the product processing station may receive, via the reader, read data associated with multiple security tags associated with multiple products within a defined range of the reader. For example, the reader may be able to detect security tags within a certain range (e.g., 10 feet). In some cases, the reader may detect security tags associated with other products that are being purchased at nearby checkout lanes in the brick-and-mortar retail store.

In some implementations, when the read data associated with the multiple security tags is detected, the product processing station may identify, using the read data, the security tag associated with the product among the multiple security tags based on an association between the security tag associated with the product and the identification tag associated with the product. For example, the product processing station may receive first image data regarding a single identification tag, as well as read data regarding the multiple security tags. The product processing station may be able to determine which security tags of the multiple security tags indicate product codes that do not match with the product code indicated in the identification tag, such that the security tag indicating the product code that does match the product code indicated in the identification tag may be a security tag of interest among the multiple security tags.

In some implementations, when the read data associated with the multiple security tags is detected, the product processing station may identify the security tag associated with the product among the multiple security tags based on a power level associated with a detection of the security tag and a non-detection of other security tags among the multiple security tags. For example, when the reader transmits at a baseline power level, the multiple security tags may be detected. The reader may reduce the baseline power level until only the security tag of interest is detected (e.g., the security tag that is located closest to the product processing station). In some implementations, when the read data associated with the multiple security tags is detected, the product processing station may identify the security tag associated with the product among the multiple security tags based on a signal strength associated with the security tag in relation to signal strengths of the other security tags among the multiple security tags. The security tag of interest, which may be located closest to the product processing station relative to the other security tags, may be associated with a high signal strength as compared to the signal strengths of the other security tags. Depending on power level reductions and/or signal strengths, the product processing system may filter the read data received from the multiple security tags to identify the security tag of interest (e.g., the security tag associated with a product of interest).

As shown by reference number 108, the product processing station may determine, based on the second image data, a direction of movement associated with the product moving through the scanning zone of the product processing station. The direction of movement may be associated with the product and/or the security tag attached to the product. The product processing station may apply computer vision (e.g., image recognition) or other related techniques to analyze the plurality of frames associated with the second image data. Based on the computer vision, the product processing station may detect the direction of movement associated with the product as the product moves through the scanning zone of the product processing station. For example, the plurality of frames may include a first frame of the product at a first time (T0), a second frame of the product at a second time (T1), and a third frame of the product at a third time (T2). The plurality of frames may be captured by the one or more cameras, which may be stationary. The plurality of frames may capture the direction of movement of the product, which may be detected using the computer vision.

In some implementations, the direction of movement associated with the product may be a left-to-right direction of movement, a right-to-left direction of movement, a top-to-bottom direction of movement, or a bottom-to-top direction of movement, where the direction of movement may be with respect to a field of view of the one or more cameras. The direction of movement associated with the product may be east-to-west or west-to-east, with respect to the field of view of the one or more cameras. The direction of movement may be a linear direction of movement or a non-linear direction of movement. In some implementations, the direction of movement may be associated with a retail store action. For example, a first direction of movement may be associated with a purchase of the product, and a second direction of movement may be associated with an arrival or a return of the product. The product processing station may be preconfigured with different directions of movement and corresponding retail store actions (e.g., a left-to-right direction of movement is associated with a purchase of the product). The different directions of movement and corresponding retail store actions may depend on a layout of the product processing station (e.g., a layout in which one end is associated with products ready for checkout and another end is associated with products that have been scanned).

As shown by reference number 110, the product processing station may configure, via the reader and based on the direction of movement associated with the product, a setting of the security tag associated with the product. The product processing station, when configuring the setting of the security tag, may configure a bit field of the security tag with a value that activates/deactivates the security tag based on the direction of movement associated with the product. The deactivation of the security tag may be based on the first direction of movement associated with the purchase of the product, and the activation of the security tag may be based on the second direction of movement associated with the arrival or the return of the product. Different directions of movement may be predefined to correspond to deactivation or activation of security tags. The bit field may be a single-bit flag associated with EAS, where a first bit (e.g., "0") may indicate that the security tag is deactivated and a second bit (e.g., "1") may indicate that the security tag is activated. The bit field may be stored in a memory of the security tag. In some cases, turning off the single-bit flag (e.g., during checkout) may deactivate the security tag, and turning on the single-bit flag (e.g., during a product return or arrival) may activate the security tag. The product processing station may be able to configure the security tag based on the read data that identifies the security tag.

In some implementations, the product processing station may configure, via the reader, the security tag of interest and not other security tags located in a vicinity of the reader. The security tag of interest may be configured based on a one-to-one relationship between the security tag and the identification tag. As a result, other security tags located in the vicinity of the reader may not be unintentionally deactivated.

As an example, a retail store clerk may scan a shirt being purchased by a consumer. The shirt may be scanned over a platter of a PoS terminal. The PoS terminal may capture an image of a barcode associated with the shirt. The PoS terminal may also capture a series of images associated with a movement of the shirt as the shirt is scanned over the platter of the PoS terminal. The PoS terminal may read, via an RFID reader, an RFID security tag associated with the shirt. The PoS terminal may verify that the RFID security tag that is read corresponds to the barcode associated with the shirt, based on a stored association between the RFID security tag and the barcode. The PoS terminal may determine, using the series of images, that the shirt is moving in a left-to-right direction when the shirt is scanned. The PoS terminal may determine, by accessing a set of rules stored at the PoS terminal, that the left-to-right direction is associated with a purchase and a deactivation of the RFID security tag. The PoS terminal may configure, via the RFID reader and based on the left-to-right direction associated with the shirt, an EAS bit field (or EAS flag) of the RFID security tag. For example, the PoS terminal may perform, via the RFID reader, a write operation (or program operation) that writes a value of "0" in the EAS bit field based on the left-to-right direction associated with the shirt. By writing the value of "0" in the EAS bit field, the PoS terminal may deactivate the RFID security tag via the RFID reader. As a result, the shirt may be taken out of a brick-and-mortar retail store without the RFID security tag triggering an alarm to be sounded.

In some implementations, the product processing station may include a component (e.g., a multi-antenna reader, a camera, or an infrared sensor) operable to capture movement data (or motion data) associated with the product moving through the scanning zone of the product processing station. The product processing station may receive, from the component, the movement data associated with the product moving through the scanning zone of the product processing station. The product processing station may receive, via the reader, the read data associated with the security tag of the product that identifies the security tag. The product processing station may determine, based on the movement data, the direction of movement associated with the product moving through the scanning zone of the device. The product processing station may configure, via the reader and based on the direction of movement associated with the product and the read data, the setting of the security tag associated with the product.

In some implementations, the movement data may depend on the component. In a first example, the component may be the multi-antenna reader (e.g., a multi-antenna RFID reader) that indicates the movement data. The multi-antenna reader may include a first antenna with a first polarity at a first position of the scanning zone and a second antenna with a second polarity at a second position of the scanning zone. Depending on the direction of movement associated with the product, the first antenna may detect movement associated with the product prior to the second antenna detecting movement associated with the product, or vice versa. The multi-antenna reader may indicate movement data that includes both movement data captured by the first antenna and movement data captured by the second antenna. In a second example, the component may be the camera that produces image data that indicates the movement data. In this case, the movement data may be derived by applying computer vision or other techniques to the image data. In a third example, the component may be multiple infrared sensors that indicate the movement data. The multiple infrared sensors may include a first infrared sensor at a first end of the scanning zone and a second infrared sensor at a second end of the scanning zone. Depending on the direction of movement associated with the product, the first infrared sensor may detect movement associated with the product prior to the second infrared sensor detecting movement associated with the product, or vice versa. The multiple infrared sensors may indicate movement data that includes both movement data captured by the first infrared sensor and movement data captured by the second infrared sensor. In some implementations, the direction of movement associated with the product may not necessarily be determined only using images, but may be determined using the reader itself and/or infrared sensors of the product processing station.

In some implementations, the product processing station may receive barcode information associated with the product. The product processing station may determine the product code based on the barcode information. The product processing station may access a server to look up the product code in a data store associated with the server. The product processing station may obtain price information for the product based on the lookup of the product code. The product processing station may display, via a user interface of the product processing station, the price information for the product.

In some implementations, the product processing station may determine, based on the second image data, the direction of movement associated with the product moving through the scanning zone of the product processing station, and the product processing station may send an indication of the direction of movement to a security device. The security device may be a device that is separate from the reader. For example, the security device may be a high frequency (HF) reader as opposed to a UHF RFD reader. The security device may configure, based on the direction of movement associated with the product, the setting of the security tag associated with the product. When configuring the setting of the security tag, the security device may activate/deactivate the security tag. As an example, the security tag may be an HF EAS tag, and the security device may be able to configure HF EAS tags, whereas the reader may be unable to configure the HF EAS tags. Thus, the product processing station may provide the indication of the direction of movement as an input to the security device, which may enable the security device to configure the setting of the security tag.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
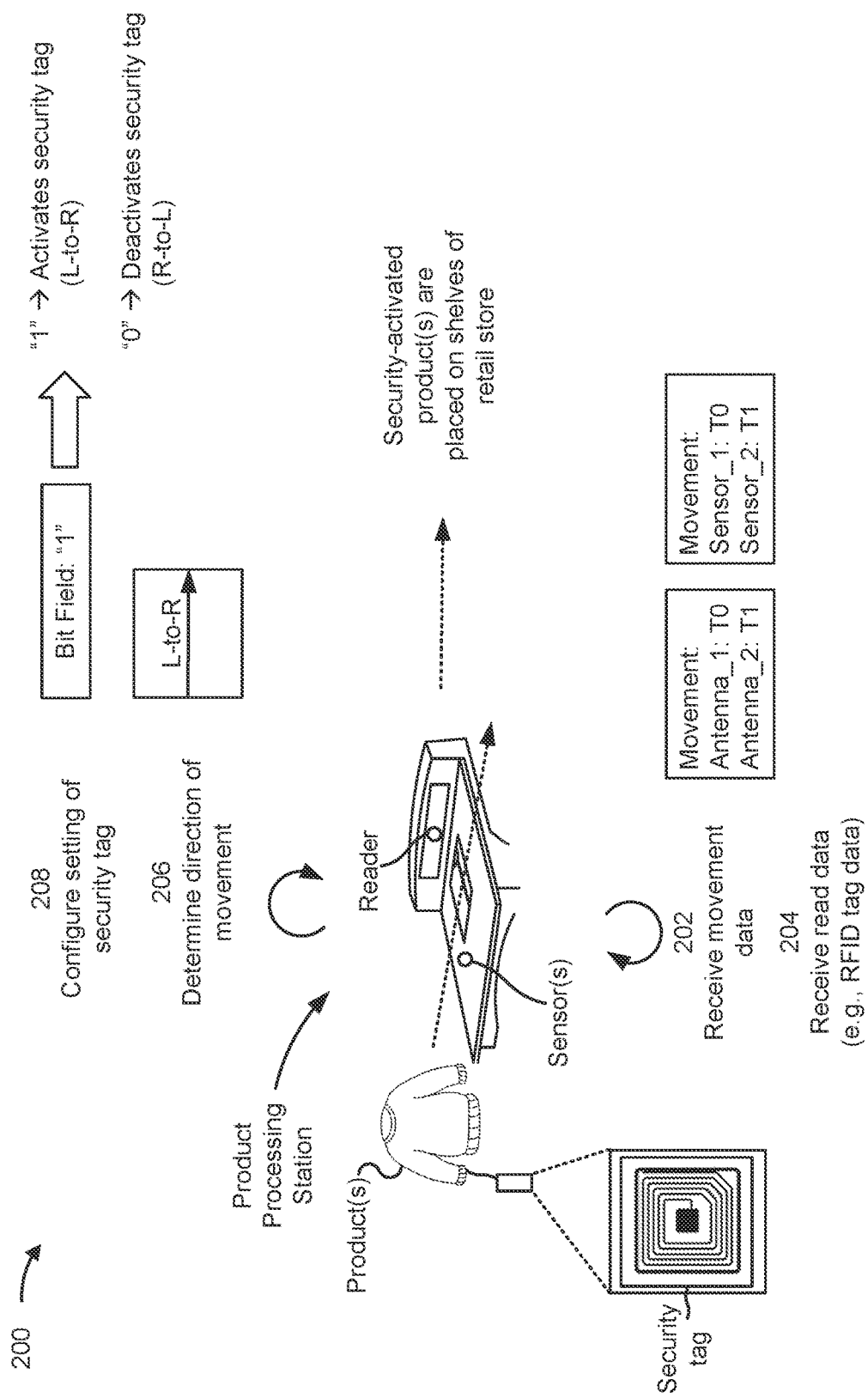
FIG. 2 is a diagram of another example implementation associated with configuring security tags based on directions of movement of products associated with the security tags, as described herein.

FIG. 2 is a diagram of an example implementation 200 associated with configuring security tags based on directions of movement of products associated with the security tags. As shown in FIG. 2, example implementation 200 includes a product processing station. These devices are described in more detail below in connection with FIG. 4 and FIG. 5.

In some implementations, the product processing station may be a backend terminal that processes incoming products at a brick-and-mortar retail store. In this example, the product processing station may not be a PoS terminal used for product purchases by customers, but rather may be located in a backroom of the brick-and-mortar retail store. The product processing station may function to configure security tags (e.g., activate security tags) for newly received products from a transport vehicle, such that the products may become available for placement on shelves of the brick-and-mortar retail store.

In some implementations, the product processing station may be operated by retail store personnel. The product processing station may include a tower and a platter. The tower and/or the platter may include a reader (e.g., an RFID reader) with multiple antennas (e.g., a multi-antenna reader), and/or one or more sensors (e.g., infrared sensors). The reader may have a wider field of view as compared to a reader of a PoS terminal. In this example, the tower and/or the platter may not include one or more cameras. The platter may be associated with a scanning zone of the product processing station. In some implementations, a product that is newly received may be associated with a security tag. The security tag may be a UHF RFID tag that supports EAS. The security tag may be attached to the product.

As shown by reference number 202, the product processing station may receive movement data associated with the product. The product processing station may receive, from the reader, the movement data as the product is scanned by the product processing station. The reader may capture, using one or more antennas of the reader, movement data associated with the product as the product moves through the scanning zone of the product processing station, and the reader may indicate the movement data to the product processing station. The movement data may indicate that a first antenna at a first position detects the product at T0 and that a second antenna at a second location detects the product at T1, where T1 occurs after T0. Alternatively, or additionally, the product processing station may receive, from the one or more sensors, the movement data as the product is scanned by the product processing station. The one or more infrared sensors may capture movement data associated with the product as the product moves through the scanning zone of the product processing station, and the one or more infrared sensors may indicate the movement data to the product processing station. The movement data may indicate that a first infrared sensor at a first end of the platter detects the product at T0 and that a second infrared sensor at a second end of the platter detects the product at T1, where T1 occurs after T0. The movement data, irrespective of whether being received from the reader or the one or more sensors, may indicate the movement of the product through the scanning zone of the product processing station.

As shown by reference number 204, the product processing station may receive, via the reader, read data (e.g., the RFID tag data) associated with the security tag. The read data may identify the security tag. For example, the read data may indicate a unique tag identification number by a manufacturer. The read data may also indicate one or more passwords, an EPC associated with the product, a UPC associated with the product, an SKU associated with the product, and/or additional information.

As shown by reference number 206, the product processing station may determine, based on the movement data, a direction of movement associated with the product moving through the scanning zone of the product processing station. The product processing station may analyze the movement data to determine which antenna or which infrared sensor first detects the product, and then which antenna or which infrared sensor subsequently detects the product. A layout of antennas and/or infrared sensors may be predefined for the product processing station. The product processing station may be able to determine the direction of movement based on which antenna or infrared sensor first detects the product and based on the layout of antennas and/or infrared sensors for the product processing station. For example, a first antenna or infrared sensor at a left-hand side of the product processing station that first detects the product, relative to a second antenna or infrared sensor at a right-hand side of the product processing station, as indicated by the movement data, may indicate that the product is moving left-to-right as the product moves through the scanning zone of the product processing station.

As shown by reference number 208, the product processing station may configure, via the reader and based on the direction of movement associated with the product, a setting of the security tag associated with the product. The product processing station, when configuring the setting of the security tag, may configure a bit field of the security tag with a value that activates/deactivates the security tag based on the direction of movement associated with the product. The deactivation of the security tag may be based on a first direction of movement associated with a purchase of the product, and the activation of the security tag may be based on a second direction of movement associated with an arrival or a return of the product. The bit field may be a single-bit flag associated with EAS, where a first bit (e.g., "0") may indicate that the security tag is deactivated and a second bit (e.g., "1") may indicate that the security tag is activated.

As an example, retail store personnel may oversee a plurality of sweaters that are newly received at a brick-and-mortar retail store from a transport vehicle. The plurality of sweaters and a plurality of respective RFID security tags may be processed by a product processing station set up in a backroom of the brick-and-mortar retail store. A sweater with an RFID security tag, of the plurality of sweaters, may be scanned over a platter of the product processing station. The product processing station may capture movement data as the sweater is scanned over the platter. The product processing station may determine, from the movement data, that the sweater is moving in a left-to-right direction when the sweater is scanned. The product processing station may determine, by accessing a set of rules stored at the product processing station, that the left-to-right direction is associated with an arrival and an activation of the RFID security tag. The RFID security tag may configure, via an RFID reader and based on the left-to-right direction associated with the sweater, an EAS bit field (or EAS flag) of the RFID security tag. For example, the product processing station may perform, via the RFID reader, a write operation that writes a value of "1" in the EAS bit field based on the left-to-right direction associated with the shirt. By writing the value of "1" in the EAS bit field, the product processing station may activate the RFID security tag via the RFID reader. As a result, the sweater may be ready to be placed on a shelf of the brick-and-mortar retail store. Further, using the product processing station, the plurality of RFID security tags associated with the plurality of sweaters may be quickly deactivated with minimal manual labor.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
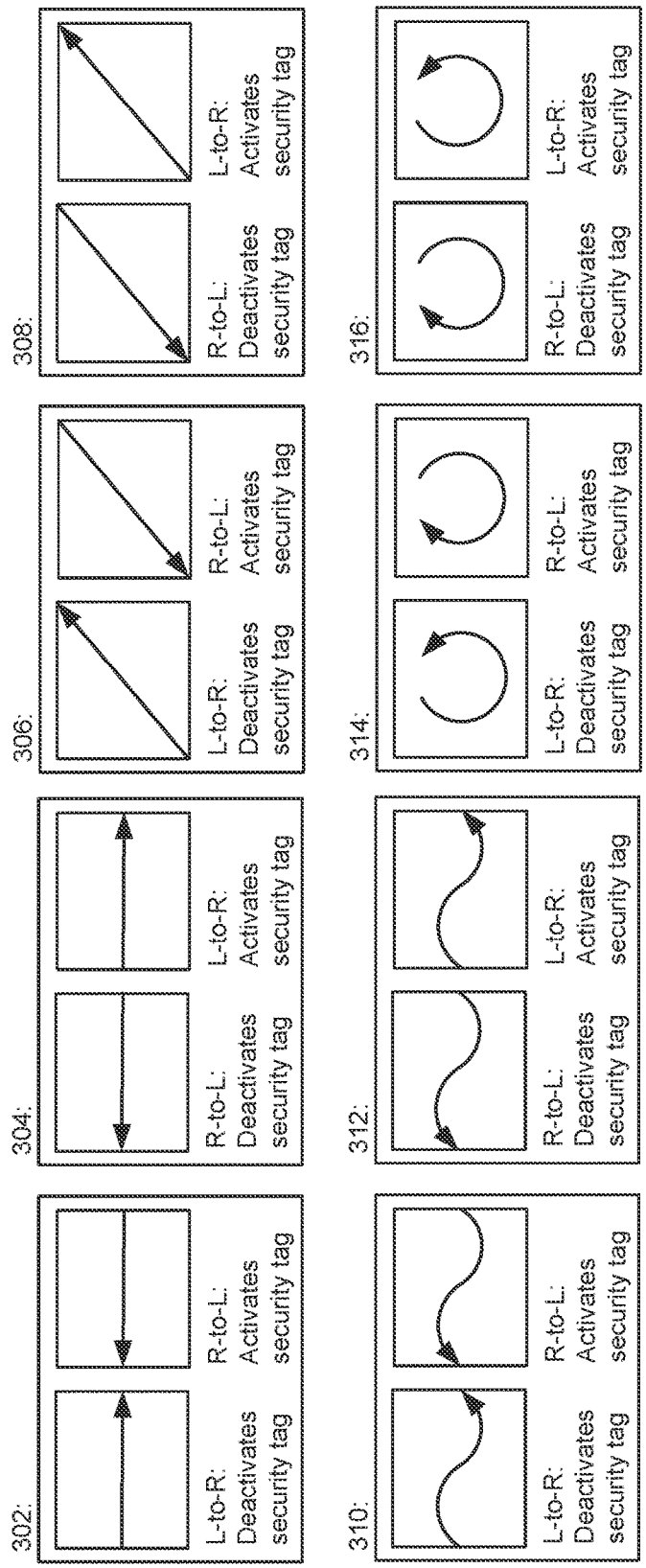
FIG. 3 is a diagram of an implementation associated with different directions of movement of products associated with security tags, as described herein.

FIG. 3 is a diagram of an example implementation 300 associated with different directions of movement of products associated with security tags, as described herein.

As shown by reference number 302, a linear left-to-right direction of movement may deactivate a security tag, and a linear right-to-left direction of movement may activate the security tag. As shown by reference number 304, a linear right-to-left direction of movement may deactivate a security tag, and a linear left-to-right direction of movement may activate the security tag. As shown by reference number 306, a linear sloped left-to-right direction of movement may deactivate a security tag, and a linear sloped right-to-left direction of movement may activate the security tag. As shown by reference number 308, a linear sloped right-to-left direction of movement may deactivate a security tag, and a linear sloped left-to-right direction of movement may activate the security tag.

As shown by reference number 310, a non-linear left-to-right direction of movement may deactivate a security tag, and a non-linear right-to-left direction of movement may activate the security tag. As shown by reference number 312, a non-linear right-to-left direction of movement may deactivate a security tag, and a non-linear left-to-right direction of movement may activate the security tag. As shown by reference number 314, a circular left-to-right direction of movement may deactivate a security tag, and a circular right-to-left direction of movement may activate the security tag. As shown by reference number 316, a circular right-to-left direction of movement may deactivate a security tag, and a circular left-to-right direction of movement may activate the security tag.

In some implementations, other linear and non-linear directions of movement may be predefined and associated with deactivations or activations of security tags.

As indicated above, FIG. 3 is provided as an example. Other examples may differ from what is described with regard to FIG. 3.

Figure 4:
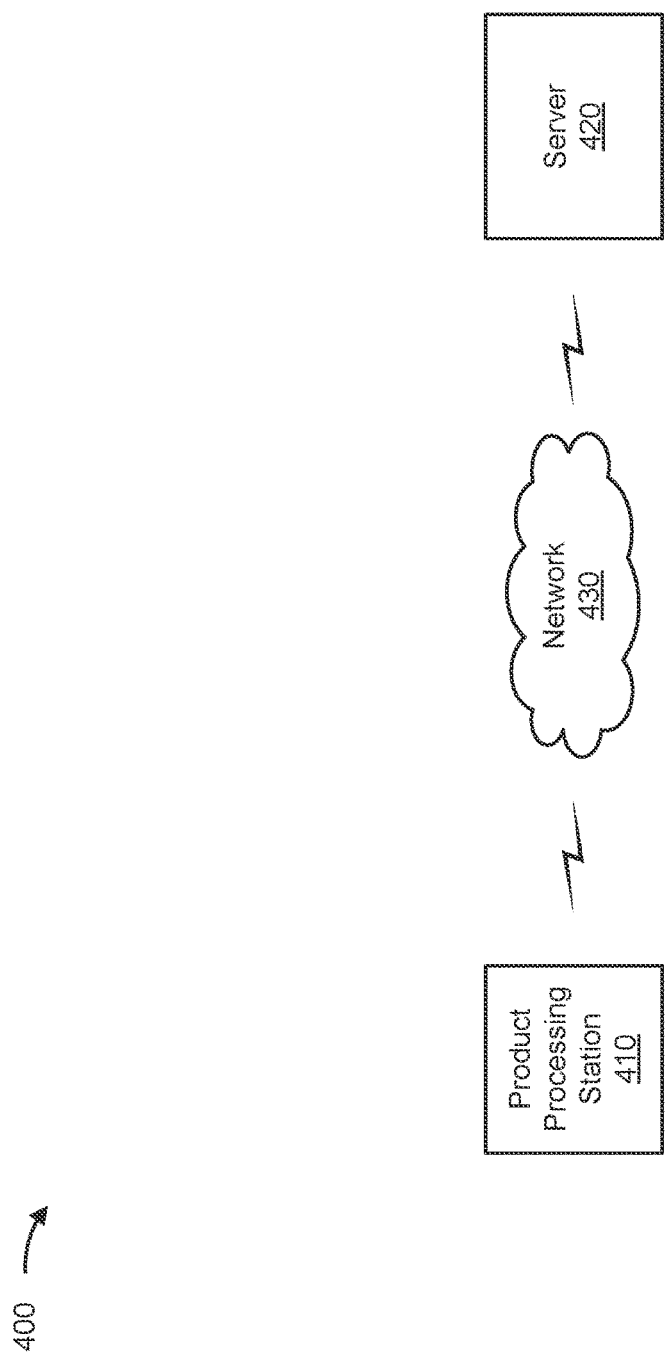
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a product processing station 410, a server 420, and a network 430. Devices of environment 400 may interconnect via wired connections, wireless connections, or a combination of wired and wireless connections.

The product processing station 410 includes one or more devices capable of receiving, generating, storing, processing, and/or providing information associated with configuring security tags based on directions of movement of products associated with the security tags, as described elsewhere herein. The product processing station 410 may include a communication device and/or a computing device. For example, the product processing station 410 may include a wireless communication device, a user device (e.g., a mobile phone, a user equipment, a laptop computer, a tablet computer, a desktop computer), one or more cameras (e.g., monochrome cameras and/or color cameras), a barcode reader, an RFID reader (e.g., a multi-antenna RFID reader), one or more infrared sensors, a point-of-sale terminal, or a similar type of device.

The server 420 includes one or more devices capable of receiving, generating, storing, processing, providing, and/or routing information associated with configuring security tags based on directions of movement of products associated with the security tags, as described elsewhere herein. The server 420 may include a communication device and/or a computing device. For example, the server 420 may include a server, such as an application server, a client server, a web server, a database server, a host server, a proxy server, a virtual server (e.g., executing on computing hardware), or a server in a cloud computing system. In some implementations, server 420 includes computing hardware used in a cloud computing environment.

The network 430 includes one or more wired and/or wireless networks. For example, the network 430 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 430 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
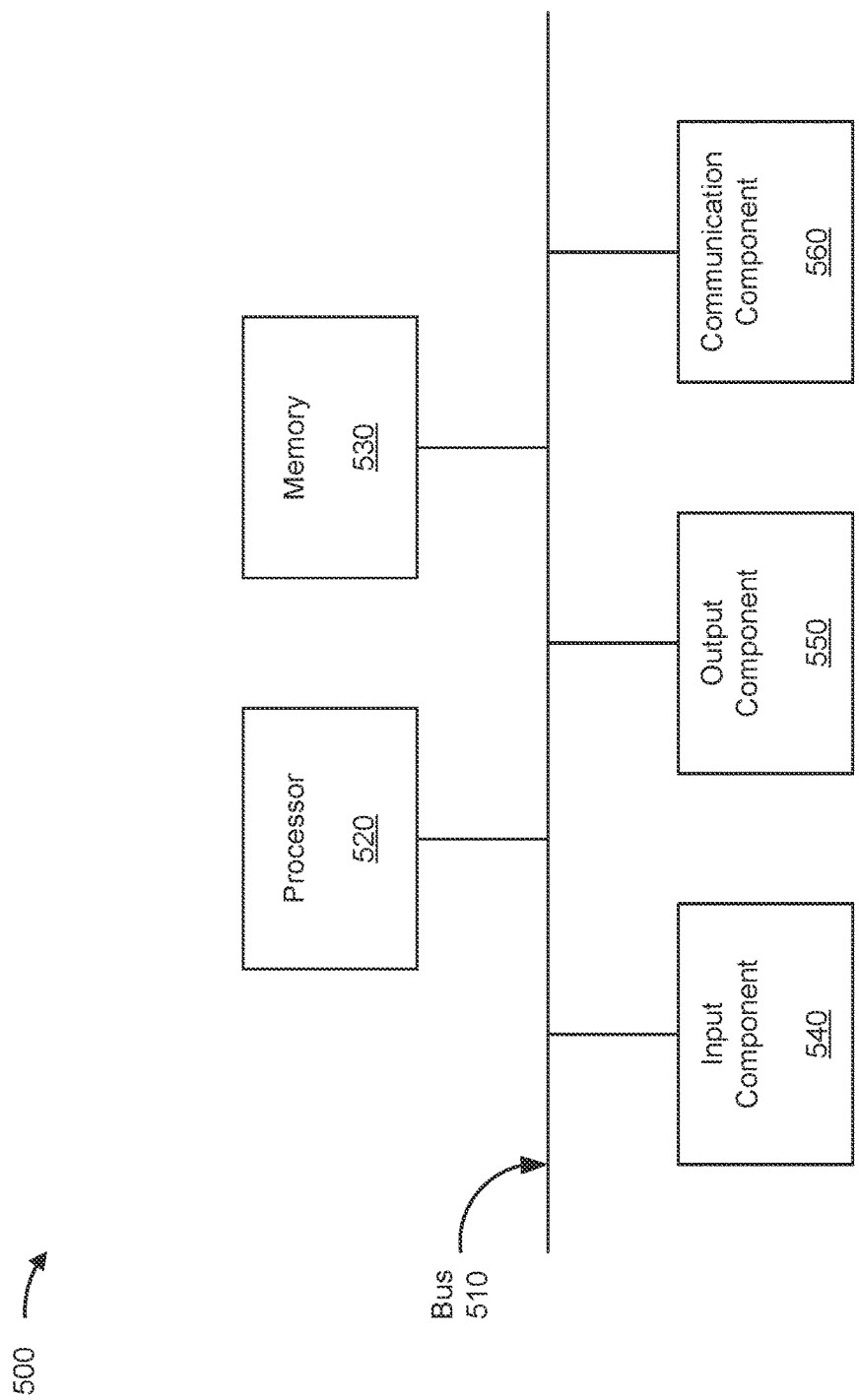
FIG. 5 is a diagram of example components of one or more devices of FIG. 4.

FIG. 5 is a diagram of example components of a device 500, which may correspond to the product processing station 410, and/or the server 420. In some implementations, product processing station 410, and/or server 420 include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

FIG. 6 is a flowchart of an example process 600 associated with configuring security tags based on directions of movement. In some implementations, one or more process blocks of FIG. 6 may be performed by a product processing station (e.g., product processing station 410). In some implementations, one or more process blocks of FIG. 6 may be performed by another device or a group of devices separate from or including the product processing station. Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving, from one or more cameras of the device, image data associated with a product in a scanning zone of the device (block 610). For example, the image data may include first image data associated with an identification tag (e.g., a barcode) of the product, and second image data associated with a movement of the product through the scanning zone of the device, as described above.

As further shown in FIG. 6, process 600 may include receiving, via a reader of the device, read data associated with a security tag of the product that identifies the security tag (block 620). For example, the reader may be an RFID reader and the reader data may be RFID tag data, as described above.

As further shown in FIG. 6, process 600 may include determining, based on the first image data and the read data, that the security tag is associated with the identification tag (block 630). For example, the security tag may indicate a product code that corresponds to a barcode associated with the identification tag, as described above.

As further shown in FIG. 6, process 600 may include determining, based on the second image data, a direction of movement associated with the product moving through the scanning zone of the device (block 640). For example, the direction of movement may be a left-to-right movement or a right-to-left movement, and the direction of movement may be a linear movement or a non-linear movement, as described above.

As further shown in FIG. 6, process 600 may include configuring, via the reader and based on the direction of movement associated with the product, a setting of a security tag associated with the product (block 650). For example, the setting of the security tag may be configured to deactivate the security tag or activate the security tag based on the direction of movement, as described above.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

As used herein, satisfying a threshold may, depending on the context, refer to a value being greater than the threshold, greater than or equal to the threshold, less than the threshold, less than or equal to the threshold, equal to the threshold, not equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for configuring security tags based on directions of movement, comprising:
   receiving, by a device and from one or more cameras associated with the device, image data associated with a product moving through a scanning zone of the device, the image data including first image data associated with an identification tag of the product, and second image data associated with a movement of the product through the scanning zone of the device;
   receiving, via a reader of the device, read data associated with a security tag of the product that identifies the security tag;
   determining, by the device and based on the first image data and the read data, that the security tag is associated with the identification tag;
   determining, by the device and based on the second image data, a direction of movement associated with the product moving through the scanning zone of the device; and
   configuring, via the reader of the device and based on the direction of movement associated with the product, a setting of a security tag associated with the product.

2. The method of claim 1, wherein configuring the setting of the security tag comprises configuring, based on the direction of movement associated with the product, a bit field of the security tag with a value that deactivates the security tag.

3. The method of claim 1, wherein configuring the setting of the security tag comprises configuring, based on the direction of movement associated with the product, a bit field of the security tag with a value that activates the security tag.

4. The method of claim 1, comprising:
   receiving, by the device via the reader, read data associated with multiple security tags associated with multiple products within a defined range of the reader; and
   identifying, using the read data, the security tag associated with the product among the multiple security tags based on an association between the security tag associated with the product and the identification tag associated with the product.

5. The method of claim 1, further comprising:
   receiving, by the device via the reader, read data associated with multiple security tags associated with multiple products within a defined range of the reader; and
   identifying the security tag associated with the product among the multiple security tags based on one of: a power level associated with a detection of the security tag and a non-detection of other security tags among the multiple security tags, or a signal strength associated with the security tag in relation to signal strengths of the other security tags among the multiple security tags.

6. The method of claim 1, wherein the direction of movement associated with the product moving through the scanning zone of the device is one of: a left-to-right direction of movement, a right-to-left direction of movement, a top-to-bottom direction of movement, or a bottom-to-top direction of movement, and wherein the direction of movement is one of a linear direction of movement or a non-linear direction of movement.

7. The method of claim 1, wherein determining the direction of movement associated with the product moving through the scanning zone of the device is based on computer vision applied to the image data.

8. The method of claim 1, wherein the direction of movement associated with the product is one of:
   a first direction of movement associated with a purchase of the product and a deactivation of the security tag; or
   a second direction of movement associated with an arrival or a return of the product and an activation of the security tag.

9. The method of claim 1, wherein the security tag is an ultra-high frequency (UHF) radio-frequency identification (RFID) tag that supports electronic article surveillance (EAS).

10. A device, comprising:
    a component operable to capture movement data associated with a product moving through a scanning zone of the device;
    one or more memories; and
    one or more processors, coupled to the one or more memories, configured to:
      receive, from the component, image data associated with the product in a scanning zone of the device, the image data including first image data associated with an identification tag of the product, and second image data indicative of the movement data associated with the product moving through the scanning zone of the device;
      receive, via a multi-antenna reader of the device, read data associated with a security tag of the product that identifies the security tag;
      determine, based on the movement data, a direction of movement associated with the product moving through the scanning zone of the device; and
      configure, via the multi-antenna reader and based on the direction of movement associated with the product and the read data, a setting of a security tag associated with the product.

11. The device of claim 10, wherein the component of the device is one of:
    the multi-antenna reader operable to indicate the movement data, wherein the multi-antenna reader includes a first antenna with a first polarity at a first position of the scanning zone and a second antenna with a second polarity at a second position of the scanning zone;
    a camera operable to produce the second image data indicative of the movement data; or
    multiple infrared sensors operable to indicate the movement data, wherein the multiple infrared sensors include a first infrared sensor at a first end of the scanning zone and a second infrared sensor at a second end of the scanning zone.

12. The device of claim 10, wherein the one or more processors configure, based on the direction of movement associated with the product, a bit field of the security tag with a value that deactivates the security tag.

13. The device of claim 10, wherein the one or more processors configure, based on the direction of movement associated with the product, a bit field of the security tag with a value that activates the security tag.

14. The device of claim 10, wherein the direction of movement associated with the product is one of:

a first direction of movement associated with a purchase of the product and a deactivation of the security tag; or a second direction of movement associated with an arrival or a return of the product and an activation of the security tag.

15. The device of claim 10, wherein the device is a point of sale terminal.

16. A tangible machine-readable medium storing a set of instructions, the set of instructions comprising:
one or more instructions that, when executed by one or more processors of a device, cause the device to:
receive, from one or more cameras of the device, image data associated with a product in a scanning zone of the device, wherein the image data includes:
first image data associated with an identification tag of the product; and
second image data associated with a movement of the product through the scanning zone of the device;
receive, via a reader of the device, read data associated with a security tag of the product that identifies the security tag;
determine, based on the first image data and the read data, that the security tag is associated with the identification tag;
determine, based on the second image data, a direction of movement associated with the product moving through the scanning zone of the device; and
configure, via the reader and based on the direction of movement associated with the product, a setting of a security tag associated with the product.

17. The tangible machine-readable medium of claim 16, wherein the one or more instructions, when executed by the one or more processors, further cause the device to: configure, based on the direction of movement associated with the product, a bit field of the security tag with a value that deactivates the security tag.

18. The tangible machine-readable medium of claim 16, wherein the one or more instructions, when executed by the one or more processors, further cause the device to: configure, based on the direction of movement associated with the product, a bit field of the security tag with a value that activates the security tag.

19. The tangible machine-readable medium of claim 16, wherein the security tag is an ultra-high frequency (UHF) radio-frequency identification (RFID) tag that supports electronic article surveillance (EAS).

* * * * *